United States Patent

[11] 3,590,712

| [72] | Inventor | Hisanori Ataka<br>Kawasaki-shi, Japan |
| --- | --- | --- |
| [21] | Appl. No. | 760,756 |
| [22] | Filed | Sept. 19, 1968 |
| [45] | Patented | July 6, 1971 |
| [73] | Assignee | Kabushiki Kaisha Ricoh<br>Tokyo, Japan |
| [32] | Priority | Sept. 29, 1967 |
| [33] | | Japan |
| [31] | | 42/62807 |

[54] MULTIPHOTOGRAPHIC DEVICE
5 Claims, 6 Drawing Figs.

| [52] | U.S. Cl. | 95/36 |
| --- | --- | --- |
| [51] | Int. Cl. | G03b 19/00 |
| [50] | Field of Search | 95/18, 36 |

[56] References Cited
UNITED STATES PATENTS

| 2,420,339 | 5/1947 | Rabinow | 95/36 |
| --- | --- | --- | --- |
| 2,950,644 | 8/1960 | Land | 95/18 X |

*Primary Examiner*—John M. Horan
*Attorney*—Burgess, Ryan & Hicks

ABSTRACT: A multiphotographic device comprising a first objective lens, a second lens comprised of a microlens group and an aperture disposed within, forwardly or backwardly of said first lens; said aperture being adapted to be formed by the intersection of two elongated slots at right angles with respect to each other, said elongated slot being provided in each of a pair of movable plates which are movable in the directions at right angle with respect to each other, alternatively said aperture being selected by said two elongated slots.

PATENTED JUL 6 1971 3,590,712

INVENTOR
HISANORI ATAKA

BY Burgess, Ryan + Hicks
ATTORNEYS

MULTIPHOTOGRAPHIC DEVICE

BACKGROUND OF THE INVENTION

The present invention relates to a multiphotographic device in general and more particularly a multiphotographic device of the type in which one image of an object to be photographed is finely split into small portions which in turn are recorded upon a single sensitive material at predetermined positions thereof as a plurality of split images; furthermore another image of another object to be photographed is split into small portions in a similar manner as described above, said split images being recorded upon said single sensitive material in such a manner the second mentioned split images are not superposed upon the first mentioned split images which have been previously recorded upon said sensitive material; and still another image of a still another object is recorded upon said single sensitive material in the similar manner as described above, and so on.

In the photographic device of the type described, an image produced by a relatively large diameter first photographic or objective lens and an aperture disposed within, forwardly or backwardly of said first lens is projected as a plurality of split images upon a sensitive material or plate disposed backwardly of a second lens comprising a microlens group. The positions of these split images to be recorded upon the sensitive material are dependent upon the positions of the aperture. Therefore, a plurality of objects can be recorded photographically upon a single sensitive material when the positions of the aperture are suitably selected. In this case, it is impossible to read or view the split images thus recorded upon the single sensitive material. In order to produce the images recorded in the single sensitive material, the optical system similar to that used in effecting a multiphotographing must be used in such a manner that the images are projected by the lights whose direction is opposite to that of the lights used in photographing. In this case, the most essential factor is that the position of the aperture relative to the first lens when the images are reproduced must coincide exactly to the position of the aperture when the images are recorded. It is also required that the positioning of the aperture must be effected successively in a simple stepwise manner. The present invention was made to meet the requirements described above.

SUMMARY OF THE INVENTION

According to one embodiment of the present invention, the aperture of the type described above is formed by the intersection of elongated slots at right angle with respect to each other, these elongated slots being provided in movable plates respectively which in turn are adapted to move in the directions at right angles with respect to each other. The width of each of the elongated slots is so selected as to be equal to the length of one side of a required aperture. One of the movable plates is positioned in one position and held stationary while the other movable plate is moved stepwise with respect to the stationary movable member plate so as to form the apertures sequentially. Thereafter, said movable plate held stationary is displaced to another predetermined position and then held stationary again. The other movable plate is moved stepwise in a similar manner as described above so as to form the new apertures. The further apertures are formed successively in the similar manner as described above so as to cover the whole surface area of a sensitive material.

According to another embodiment of the present invention, a movable belt is used as one of the above described movable plates. The movable belt is adapted to be wound around at both of the ends thereof, and makes a positioning means of the movable belt simple in construction and compact in size.

According to a still another embodiment of the present invention, a thin plate having a required number of fixed apertures is utilized in such a manner that one of the fixed apertures may be selected by the above described pair of elongated slots. In this case, it is preferable that the dimensions of an aperture formed by the pair of elongated slots are slightly larger than those of each of the fixed apertures. According to this embodiment, the relative position and dimensions of the aperture can be selected with high accuracy.

One of the objects of the present invention is therefore to provide a multiphotographic device having an aperture positioning means adapted to form one aperture at the intersection of a pair of elongated slots.

Another object of the present invention is to provided a multiphotographic device having an aperture positioning means which facilitates the actuation of movable plates which have elongated slots respectively to form an aperture.

A still another object of the present invention is to provide a multiphotographic device having an aperture positioning means adapted to exactly position an aperture without any error by utilizing an auxiliary aperture formed by the intersection of the elongated slots of the type described above relative to a fixed aperture thin plate having a number of apertures corresponding to the number, for example, of 49 pictures capable of being photographed upon a single sensitive material.

The above and other objects and advantages of the present invention will be apparent from the following description of preferred embodiments thereof, taken in conjunction with the accompanying drawing.

DESCRIPTION OF THE PREFERRED EMBODIMENT

Figure 1:
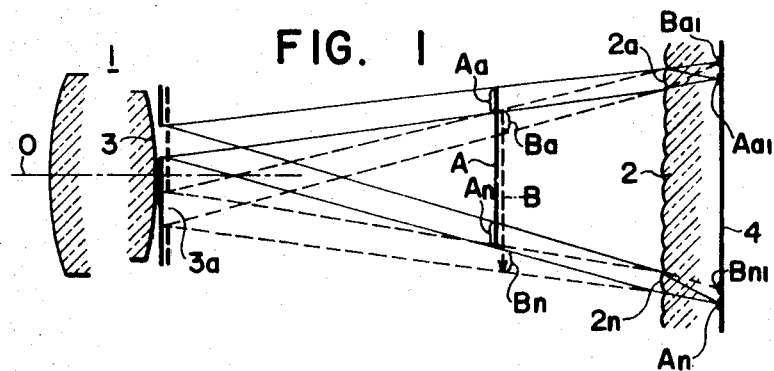
FIG. 1 is an explanatory view of a multiphotographing device according to the present invention.

The optical system of the multiphotographic device according to the present invention comprises as shown in FIG. 1, a relatively large diameter lens 1, a second lens 2 and an aperture 3 disposed immediately behind the first lens 1. The second lens 2 consists of an integrally formed microlens group in which a plurality of microlenses are arrayed in row and column into a form of a grating. The second lens 2 serves to split finely into small parts the inverted image produced by the first lens 1 so that these finely split images are focused upon a sensitive material 4 as erect images. The aperture 3 is so disposed that it may be moved vertically and transversely in the plane perpendicular to the optical axis 0 of the first lens, and serves to determine upon what position of the sensitive material 4 is focused each of the minute split images corresponding to each of limited parts of the image produced by the first lens through each of the microlenses of the second lens 2. The same effect can be attained when the aperture 3 is disposed immediately in front of or within the first lens 1. As to the sensitive material 4 which is shown as being disposed backwardly of the second lens 2, the sensitive material may be located at the back surface of the second lens or in a spaced apart relation therewith as long as the images through microlenses of the second lens 2 are sharply focused upon the sensitive material 4.

Now when an inverted image A is produced by the first lens 1 between the first and second lenses 1 and 2, one portion A$a$ of the image A included in the light ray incident upon one 2$a$ of the microlenses of the second lens 2 through the aperture 3 is focused as an erect split image A$a$1 upon the sensitive material 4. In a similar manner as described above, another portion A$n$ of the image A included in the light ray incident upon another microlens element 2$n$ through the aperture 3 is focused as an erect split image A$a$1 upon the sensitive material 4.

Next when the aperture 3 is displaced to a position designated by 3a and the taking lens or first lens l is directed to another object or scene, then the image B of that object or scene is produced in a similar manner as described above. One portion Ba of the image B included in the light ray incident upon the above described microlens element 2a through the aperture 3a is focused upon the sensitive material 4 as an erect split image Ba1 through the microlens element 2a. In a quite similar manner, another portion Bn of the image B included in the light ray incident upon the element 2n through the aperture 3a is focused upon the sensitive material 4 as a split image Bn1.

Furthermore, when the aperture 3 is displaced to a position intermediate the positions 3 and 3a, the split images of the image produced by the first lens 1 with the aperture 3 being in that position, will be focused upon the unexposed portions of the sensitive material 4, that is the portions intermediate the portions where the above described split images of the images A and B have been focused. It is of course required that whenever the aperture 3 is displaced upon photographing, the newly displaced aperture position must not coincide with the previous position of the aperture 3. The split images of the image produced by the first lens 1 are therefore distributed over the whole surface of the sensitive material 4 and are prevented from being superposed upon the other focused or exposed image upon the sensitive layer 4.

The number of pictures photographed by the device with the construction described above is dependent upon the ratio of the exposure area when the shielding plate provided with the aperture 3 is removed to the exposure area when the aperture 3 is inserted. That is, the number of pictures to be photographed is dependent upon the ratio of the effective area of the first lens 1 when disposed at the position of the aperture 3 to the opening of the aperture. For example, let it be assumed that the effective diameter of the first lens when disposed at the position of the aperture be 30mm.; the focal length, 95mm.; the distance between the aperture 3 and the image produced by the first lens, 80mm.; the distance between the aperture and the second lens 2, 40mm.; the opening of the aperture, 2mm.×2mm.; and the pitch of the stepwise displacement of the aperture in both of the vertical and transverse directions, 3mm., then 49 pictures can be photographed upon a single sensitive layer by displacing the aperture 3 in 7 steps in both of the vertical and transverse directions.

Since the image of an object photographed by the multiphotographic device of the present invention is distributed as minute split images over a single sensitive material, it is impossible to distinguish what a kind of an object or objects are recorded upon the sensitive material when the sensitive material is viewed in an ordinary manner. However, when the optical system used when the photographing is made is used and only the direction of the light rays is reversed, that is when the images recorded in the sensitive material are projected by the lights from a light source disposed at the back of the sensitive material reproduced, the same optical system as described above is used, then the photographed image or images can be reproduced.

The aperture must be located at a correct position whenever photographing is made in order to correctly determine the angle of incidence upon the second lens 2 of the light rays which split the image produced by the first lens 1. If the position of the aperture 3 should be slightly displaced from its correct position, especially when the position of the aperture when photographed is different from the position of the aperture when the image is reproduced, the perfect reproduction of the photographed image can not be made. Furthermore, the aperture 3 must be displaced vertically and transversely within the plane perpendicular to the optical axis of the first lens to a new position whenever photographing is made, regardless of the sequence of the steps to that new position in the vertical or transverse direction.

Figure 2A:
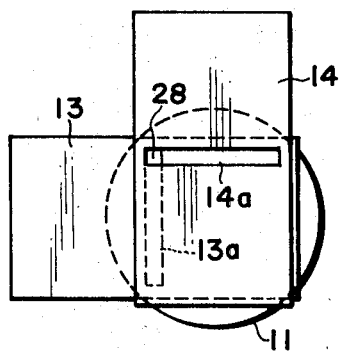
FIGS. 2A and 2B are rear views illustrating the essential part of one embodiment of the present invention.
Figure 2B:
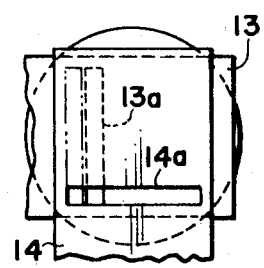

Now reference is made to FIGS. 2A and 2B wherein reference numeral 11 designates a first lens, and a movable plate 13 has an elongated slot 13a whose width is equal to the length of one side of an aperture in a form of a regular square. The movable plate 13 is movable only in the transverse direction in the figures within the plane perpendicular to the optical axis (the vertical axis relative to the paper) of the first lens 11. Another movable plate 14 which is movable only in the vertical direction within the above described plane has an elongated slot 14a whose configuration is similar to that of the above described elongated slot 13a. These elongated slots 13a and 14a intersect at a right angle with respect to each other so as to form a square aperture 28 as shown in FIG. 2A.

Whenever one photographing is made, the movable plate 14 is caused to displace downwardly in stepwise manner by a distance slightly longer than the width of the elongated slot 14a by means of a positioning device not shown. On the other hand, the other movable plate 13 is held stationary until the elongated slot 14a of the movable plate 14 reaches the lowermost aperture forming position of the elongated slot 13a. Thereafter, the movable plate 13 is displaced by one step toward the right as shown in FIG. 2B by means of a positioning device not shown after the photographing through the aperture formed by the lowermost portion of the elongated slot 13a and the leftmost portion of the elongated slot 14a is accomplished. Next, the movable plate 14 is moved upwardly step by step from the lowermost aperture forming portion of the elongated slot 13a. Thus, it will be clear that each exposure is made upon a stationary sensitive material whenever the vertical movable plate 14 is displaced one step upwardly or downwardly while the transversely movable plate 13 is kept stationary and that the transversely movable plate 13 is advanced one step toward the right whenever the vertical movable plate 14 accomplished one downward or upward stepwise stroke from the uppermost portion to the lowermost portion of the elongated slot 13a or vice versa. In this case, it will be clear that a number of pictures recorded upon a single sensitive material is the product of a number of steps of the elongated slot 13a from one side to the other side multiplied by a number of steps of the elongated slot 14a in the course of the downward or upward stepwise movement thereof. For example, let it be assumed that a number of steps of each of the elongated slots 13a and 14a are 7, then 49 pictures can be photographed upon a single sensitive material. In the embodiment described in detail hereinabove with reference to FIGS. 2A and 2B, a driving mechanism is required in order to impart to the elongated slot 14a a vertical reciprocal movement.

Figure 3A:
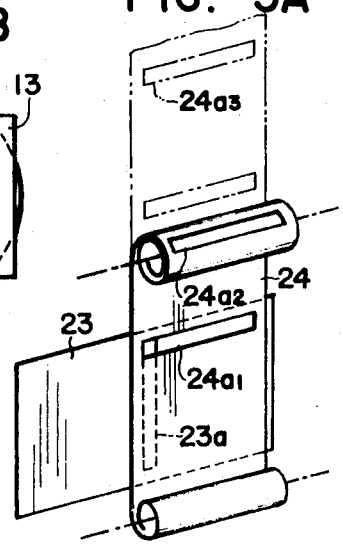
FIGS. 3A and 3B are perspective views illustrating only the essential part of another embodiment of the present invention.
Figure 3B:
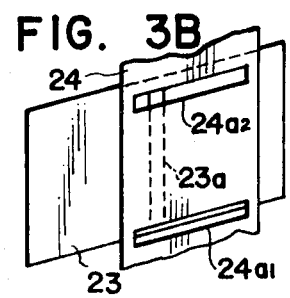

Next reference is made to FIGS. 3A and 3B wherein is illustrated a moving belt designated as 24 having a plurality of elongated slots 24a1, 24a2, 24a3 and so on disposed in parallel to each other. Each of these slots is adapted to cooperate with an elongated slot 23a of a plate 23 which is movable in the transverse direction. The moving belt 24 is caused to move downwardly in stepwise manner whenever one photographing is made so that when the elongated slot 24a1 has passed through the lowermost aperture forming portion of the elongated slot 23a, the next elongated slot 24a2 begins to intersect with the upper portion of the elongated slot 23a. At this time the elongated slot 23a is caused to move one step toward the right so that an aperture is formed at the uppermost portion of the second column. In a similar manner, whenever the elongated slot of the moving belt 24 has passed through the lowermost portion of the elongated slot 23a, the elongated slot 23a is caused to move one step toward the right so that the apertures are formed in new positions sequentially. Since the moving belt 24 is kept moving in one direction only until a single sensitive material is completely exposed, the slot driving mechanism used in the embodiment shown in FIGS. 3A and 3B can be made simpler in construction as compared with those used in the first embodiment shown in FIGS. 2A and 2B. This is one of the advantages of the second embodiment of the present invention. After the single sensitive material has been fully exposed, the moving belt 24 may be moved upwardly or may be moved back stepwise upwardly for the exposure of a newly replaced sensitive material.

Figure 4:
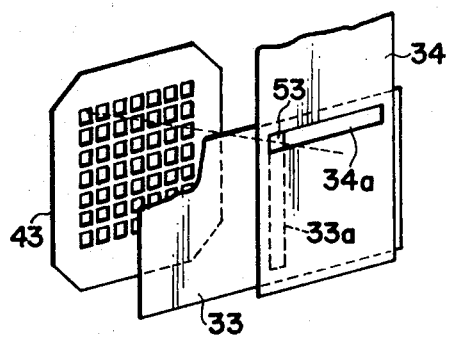
FIG. 4 is a perspective view of the essential part of a still another embodiment of the present invention.

Next reference is made to FIG. 4 wherein is illustrated the third embodiment of the present invention having a thin plate 43 provided with fixed apertures whose number corresponds to that of the pictures to be photographed on a single sensitive material. One of the fixed apertures of the thin plate 43 is adapted to be selected by an aperture 53 formed by both of elongated slots 33a and 34a which intersect each other as shown in FIG. 4 whenever one photographing is made. Since the dimensions of the aperture 53 formed by the intersection of the elongated slots 33a and 34a are so determined as to be slightly larger than those of the fixed aperture, there is an advantage that even if there occurs an erratic operation of displacing both of movable plates 33 and 34 having the elongated slots 33a and 34a respectively, there is no change in the effective aperture position so that the design requirements for the driving mechanisms of the movable plates 33 and 34 may have much tolerance, whereby the photographing device of the type described whose aperture position can be set with high accuracy can be provided.

While the principles of the present invention have been made clear in the illustrative embodiments, there will be immediately obvious to those skilled in the art many modifications in structure, arrangement, proportions, the elements, materials and components used in the practice of the present invention and otherwise, which are particularly adapted for specific environments and operating requirements, without departing from those principles. The appended claims are therefore intended to cover and embrace any such modifications, within the limits only of the true spirit and scope of the present invention.

I claim:

1. A multiphotographic device comprising:
a first lens;
a second lens having a microlens group spaced from said first lens;
means forming an aperture located closely adjacent said first lens and between said first and second lenses;
photosensitive material located closely adjacent said second lens on the side remote from said first lens;
said first lens and aperture producing an inverted image between said first and second lenses, and said second lens producing a reinverted image through individual lenses of said group focused on said photosensitive material;
said aperture forming means comprising:
a first flat element positioned to move transversely of said first lens;
said first element having an elongated slot formed therein, said elongated slot extending at right angles to the direction of movement of said first element;
a second flat element positioned to move at right angles with respect to said first element;
said second element having at least one elongated slot formed therein, said elongated slot extending at right angles to the direction of movement of said second element; and
said aperture being formed by overlap of portions of said elongated slots, the shape of said aperture in right angle dimensions being determined by the width of each slot.

2. Device according to claim 1, in which said elongated slot in said first element extends in a vertical direction, said elongated slot in said second element extends in a horizontal direction, the width of each slot is equal to the width of the other, and the aperture has a square shape.

3. Device according to claim 2, in which said first element comprises a plate moving horizontally in step by step equal increments and being held stationary in an individual step position as said second element which comprises a plate is movable from an initial position vertically downward in step by step equal increments until the overlap is at the lowermost end of said vertical slot, said second plate thereupon moving vertically upward to said initial position while said first plate moves to its next step position.

4. Device according to claim 2, in which said second element is a flexible belt having a plurality of elongated slots formed therein, said slots being parallel and spaced apart a distance substantially equal to the length of said vertical slot.

5. Device according to claim 2, in which a fixed plate is provided having rows of apertures, the individual moving apertures formed by the overlap of said elongated slots being selectively alignable with each one of said fixed apertures, and the size of each fixed aperture being slightly smaller than the size of each overlapped moving aperture.